United States Patent

Rembaum et al.

[11] 3,899,534
[45] Aug. 12, 1975

[54] CROSS-LINKED POLYELECTROLYTES
[75] Inventors: Alan Rembaum; Shiao-Ping S. Yen, both of Altadena, Calif.
[73] Assignee: California Institute of Technology, Pasadena, Calif.
[22] Filed: Apr. 30, 1973
[21] Appl. No.: 355,927

Related U.S. Application Data
[62] Division of Ser. No. 188,619, Oct. 12, 1971, abandoned.

[52] U.S. Cl............. 260/567.6 P; 424/78; 424/329; 106/15
[51] Int. Cl............................................. C07c 87/68
[58] Field of Search............ 260/2 R, 567.6 P, 2.1 R

[56] References Cited
FOREIGN PATENTS OR APPLICATIONS
565,423   10/1958   Canada............................ 260/567.6
847,833   9/1960   United Kingdom................. 260/2 R
652,830   5/1951   United Kingdom................. 260/2 R

*Primary Examiner*—Bernard Helfin
*Assistant Examiner*—James H. Reamer
*Attorney, Agent, or Firm*—Marvin E. Jacobs

[57] ABSTRACT

A polymer which is formed from the reaction of an aromatic compound having at least three halomethyl substituent groups with a tertiary amine having at least two alkylamine groups wherein the nitrogens therein are separated by at least three carbon atoms and with a dihalo substituted organic compound to form a cross-linked, water-insoluble polyquaternary ammonium polymer.

6 Claims, No Drawings

CROSS-LINKED POLYELECTROLYTES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

CROSS-REFERENCE TO RELATED APPLICATION

This application is a division of Ser. No. 188,619, filed Oct. 12, 1971, now abandoned.

BACKGROUND OF THE INVENTION

1. Field of the Invention

This invention is in the field of polymers. More particularly, the invention relates to polymer compounds having high halogen and nitrogen content which can be deposited on various substrate materials.

2. Description of the Prior Art

Prior to the herein invention, a compound known as benzalkonium having the following formula:

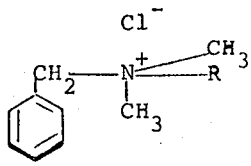

where R is an alkyl of 2 to 20 C atoms, was used or known as an antimicrobial agent. The benzalkonium compound is a solid which is soluble in water. As a result, it can readily be leached out of materials. Other disadvantages of the benzalkonium compound is that it cannot be formed as a continuous layer or coating. Thus, though the benzalkonium type of product has been known to possess good antimicrobial properties, no means was available for incorporating it into materials and the like in an insoluble form and no means was available to make plastic or elastomeric coatings. Thus, it is an object of this invention to provide a product having a benzalkonium type radical or other antimicrobial groups incorporated therein, which product is insoluble in water and is capable of forming polymeric coating. Further, it is an object of this invention to provide a product having a benzalkonium type radical and other antimicrobial groups therein which can be impregnated and coated onto various materials or substrates.

SUMMARY OF THE INVENTION

The above and other objects of this invention are accomplished by forming an insoluble polymeric material, containing a benzalkonium type radical. This is accomplished by utilizing a halomethylated aromatic compound such as, for example, 2,4,6-trichloromethyl mesitylene as one of the starting materials. The halomethylated aromatic should contain at least two halomethylated groups as, for example, in the specific compound set forth above. This aromatic is then reacted with a tertiary amine having at least two alkyl amine groups wherein the nitrogens are separated by at least three carbon atoms. A typical example of such a material is tetramethyl-1,6-diamino hexane. The product of the invention is formed by providing that one of the two reactants is at least a trifunctional material. For example, if a difunctional tertiary amine compound is viewed as a monomer material in the herein process and it can be reacted with a trifunctional halomethylated aromatic which serves as a cross linking agent to form a cross-linked polymeric network at generally ambient conditions. Alternatively, dihalo compounds can be reacted with tertiary amines containing three alkyl amino groups. When the two ingredients are mixed in the presence of a substrate which can include fabric, paper or the like, the polymeric material will precipitate on the substrate. As will be explained, other materials can be added to the basic reaction so as to control the rigidity of the formed polymeric material. This includes a halomethylated aromatics having only two halomethyl groups present as well as halo terminated alkenes or alkanes. It is believed the invention will be further understood from the following detailed description and example.

DESCRIPTION OF PREFERRED EMBODIMENTS

The herein invention is directed to novel polymeric materials which are formed by reacting a ditertiary amine compound with a halomethylated aromatic compound where one of the reactants is at least trifunctional to provide a cross-linked network. For example, if the halomethylated aromatic is to serve as a cross linking agent, it must possess at least three halomethylated groups which are substituted onto the aromatic ring. The aromatic compounds can have other substituents thereon which will not interfere with the action of the halomethyl groups, and their ability to serve in a reactive manner to cross link the tertiary amine compounds utilized. The formation of halomethylated aromatics is well known in the art and comprises normally starting with a fully methylated aromatic and then selectively reacting the aromatic with chloromethylating agents to obtain the desired halomethyl groupings. A preferred and typical halomethyl aromatic used in the herein invention is 2,4,6-trihalomethylmesitylene having the formula:

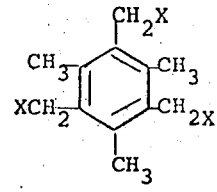

where X is selected from the group consisting of bromo, chloro and iodo. As can be seen, the above preferred compound is a benzene ring substituted alternately with halomethyl and methyl groups. The same type material can be utilized with the benzene ring being completely chloromethylated, in other words, having six chloromethyl groups, or alternatively having hydrogen in place of the methyl groups such that it would be only substituted with chloromethyl groupings. In addition to the benzene ring, aromatics such as toluene, biphenyl, xylene, naphthalene and the like substituted with halomethyl groups can be utilized. If the halomethylated aromatic is to serve as a monomer, then it can be difunctional and at least a trifunctional tertiary amine is required as a cross linking agent.

The above described halomethylated aromatics are reacted with tertiary amine compounds having the general formula:

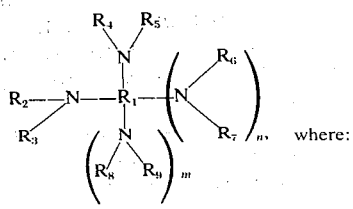

$R_1$ is an organic radical containing at least three carbon atoms such as alkylene, alkenylene, arylene, aralkylene and alkarylene. The carbon atoms in $R_1$ may be interrupted with oxygen or sulfur such as alkylene-oxy or alkylene-thio. $R_1$ can also contain nitrogen such as in urethane groupings. $R_1$ can contain up to 30 carbon atoms but preferably does not contain more than 20 carbon atoms. $R_2$ to $R_9$ are individually selected from the group consisting of hydrogen and alkyl groups of 1 to 20 C atoms. $n$ and $m$ are 0 or 1. Typical of the tertiary amines compounds contemplated herein include for example N,N,N',N'-tetramethylhexamethylenediamine, N,N,N',N'-tetramethyldecamethylenediamine, 1,2-bis-(4-pyridyl)ethane, 1,2-bis-(2-pyridyl)ethane, 1,2-bis(4-pyridyl) ethene, and N,N,N'N'-di(4-benzylamino)ethane. Additional examples include: N,N,N'N'-tetramethyltriethyleneglycoldiamine; N,N,-N'N'-tetraethyl-1,4-cyclohexylenediamine; N,N'-bis-(2-hydroxyethyl)piperazine; 1,10-bis(diethylaminomethyoxy)decane; bis-(4-morpholino)dodecane; bis-(1-piperidyl)octane; 1,6-bis(dimethylamino)-2,5-dimethylhexane; N,N,N',N'-tetramethyl-p-phenylenediamine; N,N,N',N'-tetraethyl-1,6-diamine-3-hexane; N-allyl-N,N',N'-trimethyloctadecamethylenediamine; 1,2-bis(dimethylamino)propane; di(p-dimethylamino) phenyl ether; N,N'-dimethyl-N,N'-diethylhexamethylenediamine; alpha, alpha'-dipyridyl; 4-(beta-N-piperidylethyl)quinoline; alpha-(gamma-dimethylaminoethyl)pyridine; 4-(beta-N-piperidylethyl)-6-methoxyquinoline; 1,4-bis(2-imidazolinyl)butane; 1,5-bis(2-oxazolinyl)pentane; 1,6-bis(2-thiazolyl)hexane; 1,10-bis(2-benzimidazolyl)decane; the reaction product of bis 1,3-(dimethylamine)-2 propanol and a diisocyanate such as hexamethylene diisocyanate, tri-N,N,N-dimethylamino phenol, hexamethylene tetramine, and hexamethyl triethylene tetramine.

The reaction between a tertiary amine and crosslinking agent which is the aforedescribed halomethylated aromatic is seen in the following exemplary reaction to produce a precipitated insoluble polymeric material:

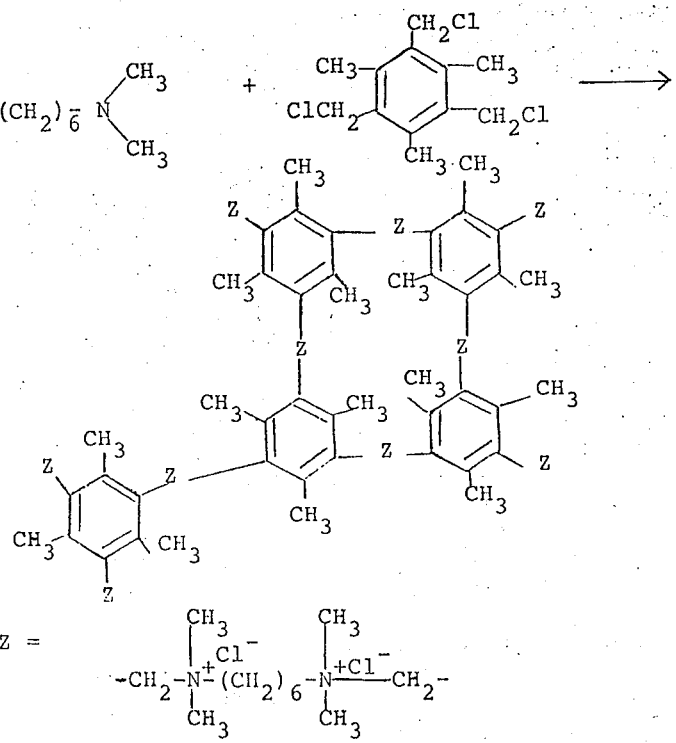

Where: Z =

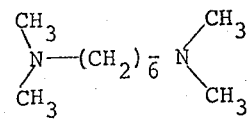

To achieve the aforegoing polymerization there should be a ratio of one halogen group to each nitrogen group present on the ditertiary amine. This requirement thus establishes the relative ratio between the two ingredients. Either or both of the components, particularly if one component is a solid, is placed in a suitable solvent. The amount of solvent utilized is not critical as long as there is a sufficient amount to achieve the desired solution. Either polar or non-polar solvents may be utilized and thus, for example, include tetrahydrofuran, benzene, toluene, dimethylformamide, methanol, acetone or mixtures thereof. It has been found that usually the reaction proceeds at a faster rate in polar solvents or solvents of high dielectric constant. The desired polymerization then occurs at ambient pressure at a temperature range between 0° and 80°C. The aforegoing is a method for forming the polymers of this invention alone from solution. However, an additional method for forming such polymers, particularly on substrate materials, can involve placing the substrate, such as a fabric or the like, in a solution of one of the two reactants and then subjecting the substrate so impregnated to the second reactant. For example, one could place a piece of fabric in a normally liquid ditertiary amine compound. The resulting impregnated fabric could then be subjected to vapors from a halomethylated compound, such vapors being produced by heating one of the reactants in an evacuated container or at 1 to 5 atmospheres. Alternatively, of course, the fabric impregnated with the ditertiary amine could be placed in a solution of the halomethylated compound and then heated.

An additional approach is to place the fabric or substrate in a solution of both reactants. Preferably a solvent is used where the polymerization proceeds very slowly or not at all at ambient temperature or below such as non-polar solvents including benzene or chloroform. After a suitable residence time to maximize absorption of the reactants, the substrate is then removed and heated to an elevated temperature of, for example, between 50° and 80°C to cause rapid polymerization of the reactants on the substrate. Then the material can be placed in a vacuum to remove the solvent. Generally, however, it is preferred that pure compounds be utilized in the reactants. Thus, for example, where the material is initially impregnated with the first reactant, if it is in solution form, then the solvent should be removed before then contacting the material with vapors of the second reactant. In other words, at the point where the two reactants come in contact with each other to form the polymers of this invention, there is preferably no solvent present and the two reactants are allowed to react alone. The reason for this is to produce a product free of solvent.

After the reaction of the tertiary amine and halomethylated aromatic to form a cross-linked polymer in accord with the typical reaction I above, there will generally be some pendant unreacted halomethyl groups present. It is most desirable to maximize or achieve the highest density of the $N^+X^-$ sites present. Thus, one can react the formed polymer with monomeric tertiary amines to produce the highest density of such charges. Typical mono amines that can be used for this purpose to react the unreacted chloromethyl groups include but are not limited to dimethyl cetyl amine, dimethyl decyl amine and other trialkyl amines. Additionally, it is possible that there will be some unreacted nitrogens in the formed polymeric material. Thus, one can further treat the formed polymers with a compound containing a halogen such as dilute HCl or benzylchloride to quaternize these unreacted nitrogens. Thus, it is possible to obtain a maximum density charge in the formed cross-linked polymers of the present invention by reacting them with both mono amines and compounds containing chlorine. The resulting polymer having high charge density is not only useful for antimicrobial purposes due to the presence of the benzalkonium type material, but further because of the high density charge, is also a good electrical conductor and thus could be utilized to coat or impregnate paper and make it electrically conductive for various reproduction processes where conductive paper is required. Also because of the high electrical conductivity of the formed polymeric materials herein, they can be utilized to impregnate fabrics and the like as an anti-static agent.

The above described Reaction I between a ditertiary amine compound and the chloromethylated material produces a rigid cross-linked network. One can control the flexibility of the formed product by effectively decreasing the cross-linked network of the polymer through the utilization of difunctional molecules which will react in the same way as the halomethyl groups. For example, one can incorporate into the polymerization Reaction I, aromatic compounds having only two halomethyl groups rather than three or more. Thus, for example, a compound having the formula:

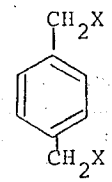

can be utilized to decrease the rigidity of the cross-linked product. As can be seen the aforegoing compound has only two halomethyl groups and would tend to produce linear type polymer structures or in other words increase the length of the polymer chain between the cross linking sites and reduce the rigidity thereof. In addition to the utilization of halomethylated aromatics to reduce the cross linking of the polymers, material such as dihalo terminated alkylenes can be utilized having the general formula:

where $y$ is 2 to 20. Once again, the above dihalo terminated alkylene will react with the nitrogen sites on the ditertiary amines to form a polymeric linear type polymer material and serve to effectively lengthen the distance between cross-linking sites and increase the flexibility of the formed polymer. Thus, however, there should be sufficient trifunctional cross-linking halomethylated aromatic compound present to achieve the desired polymers of this invention and obtain the insoluble products. Thus, in any event, there should be at least 0.10 weight percent of the trifunctional or multifunctional material present based on the total amount of reactants used.

Though the previous discussion was related to the use of at least a trifunctional halomethyl aromatic as a cross-linking agent, the same rationale applies to the situation where at least a tri-functional tertiary amine cross-links a difunctional halomethyl aromatic. Thus, in such an instance a small amount of the cross-linking tertiary amine can be used with an amount of ditertiary amine to achieve flexibility in the produced cross-linked halomethyl aromatic. A convenient and economical cross-linking tertiary amine is the product of the reaction of hexamethylene diisocyanate with tetramethyl amino propanol.

As indicated, one of the advantages of the herein invention is the ability to form an insoluble polymeric product containing the benzalkonium radicals. To further increase the antimicrobial properties of the formed polymer, one can contact it with a solution of a halogen source selected from the group consisting of bromine and iodine as disclosed in copending application Ser. No. 36,431 filed May 11, 1970. In this copending aplication there application disclosed forming an insoluble salt of a linear quaternary ammonium polymer. In the quaternary ammonium polymer salt, it is to be noted that there is present the $N^+X^-$ sites. The effect of the additional halogen is to form a trihalide at the nitrogen centers. Thus, a solution of alkali metal halide mixed with a halide such as KI and $I_2$ or KBr and $Br_2$ in water can be added to the formed polymer of this invention. For example, if the polymer of the invention is precipitated into or onto a substrate, the substrate can then be subsequently dipped into the aqueous solution of the alkali metal halide and halogen to further decrease the solubility of the polymeric material.

It is believed the invention will be better understood from the following detailed examples:

EXAMPLE I

Twelve yards of number 704, 2-0-white braided silk was weighed. To the silk was added 3.74 grams of tetramethyl-1, 6-diaminohexane (TAH) liquid. The TAH and silk were then stirred and allowed to sit for 15 minutes. Additionally, there was mixed together 3.241 grams of 1,10-dibromodecane and 2.86 grams of 2,4,6-tris-chloromethyl-mesitylene which were dissolved in 37.3 milliliters of a mixture of dimethylformamide and methyl alcohol. The second solution of the dibromodecane and mesitylene was then added to the silk in TAH and the two mixtures allowed to stand 24 hours. The time to precipitation was noted and took approximately 8 minutes as seen from the gelation of the polymer in the solution. At the end of the 24 hour period the silk was then removed and allowed to dry and was ready for utilization as suture material. Inhibition zone tests using S. Aureus and E Coli showed 4–5 mm bacteria free zones. The activity persisted for a period of at least 5 weeks.

EXAMPLE II

The procedure of Example I was repeated utilizing 12 yards of 2–0 white braided mersilene. In this example, 3.36 grams of TAH was utilized together with 2.881 grams of the dibromodecane and 2.541 grams of the mesitylene. The amount of solvent used was the same as in Example I. A very small precipitation was noted within 4 minutes. The entire solution solidified, however, during the 24 hour period.

EXAMPLE III

In this Example, 12 yards of the braided mersilene of Example II was utilized weighing 1.00 grams. The mersilene was placed in a jar. 2.87 grams of the dibromodecane and 2.54 grams of the mesitylene compound of Example I were dissolved in 33 milliliters of alpha dichlorobenzene. The solution was then added to the mersilene in the jar and the jar was heated in an oven at 100°C for 2 hours to swell the mersilene with the solution. In another 2 hours the jar was removed from the oven and cooled to room temperature and 2.87 grams of TAH was added thereto and precipitation was noted at 120 minutes. At the end of the 18 hour period of time, the mersilene with the polymer thereon was removed from the jar and washed with methanol and placed in an oven at 100°C to dry.

EXAMPLE IV

A mixture of 2.65 grams of 2,4,6-tris-chloromethyl mesitylene and 2.6 grams of tetramethyl-1,6-diamino hexane was dissolved in a solvent containing 50 cc of dimethylformamide and 50 cc of methanol. The mixture was left standing overnight at room temperature whereupon a gel formed. The remaining liquid was then filtered off and the gel was washed with acid. This gel, which is the cross linked tetramethyl ammonium hexane polymer of this invention, indicated an inhibation zone to S. Aureus and E. Coli.

The product of this example was also formed without the utilization of the solvent materials by mixing together the two reactants and heating them to 80°C for 10 minutes.

EXAMPLE V

A tetrafunctional amine was synthesized and the isolated and the characterized product was reacted with $\alpha,\alpha'$-dibromomethyl metaxylene. The final crosslinked network contains benzalkonium groups.

The synthesis of the tetrafunctional amine is illustrated by the below reaction of bis 1,3-(dimethylamino)-2 propanol and hexamethylene diisocyanate'.

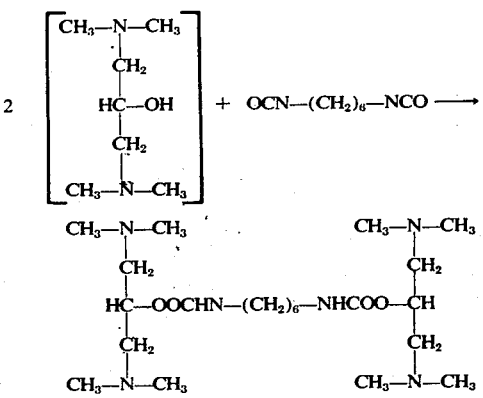

As can be seen, each hydroxy group adds to an isocyanate group to form a urethane linkage. Further reaction with $\alpha,\alpha'$-dibromomethyl metaxylene results in a quantitative yield of a crosslinked resin. To produce the resin, 138.25 grams of hexamethylene diisocyanate was dissolved in 50 ml of toluene. This solution was then mixed with 22 g of bis 1,3-(dimethylamino)-2 propanol. The mixture was then heated to 90°C for a period of 20 minutes. 500 ml of petroleum ether was then added followed by separation of the formed heavy layer. The separated heavy layer was then dried in a vacuum oven. The dried layer yielded a solid final product which was the tetrafunctional amine shown in the above reaction and confirmed by NMR examination. A 90 percent yield was obtained.

2.25 g of the above-formed tetrafunctional amine was then dissolved in 20 cc of a 1:1 volume mixture of dimethylformamide (DMF) and benzene. The above solution was then added to a second solution containing 2.6 g of the $\alpha,\alpha'$-dibromomethyl metaxylene in 20 cc of a 1:1 volume mixture of DMF and benzene. After heating of the two solutions to 60°C, a crosslinked resin of this invention was isolated. The yield of the dry resin product was 90 percent.

EXAMPLE VI

In this Example, a tetrafunctional amine was synthesized from commercially available toluene diisocyanate, known as TDI. The TDI was reacted with bis 1,3-(dimethylamino)-2 propanol, in accordance with the following reaction:

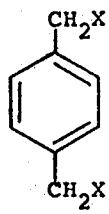
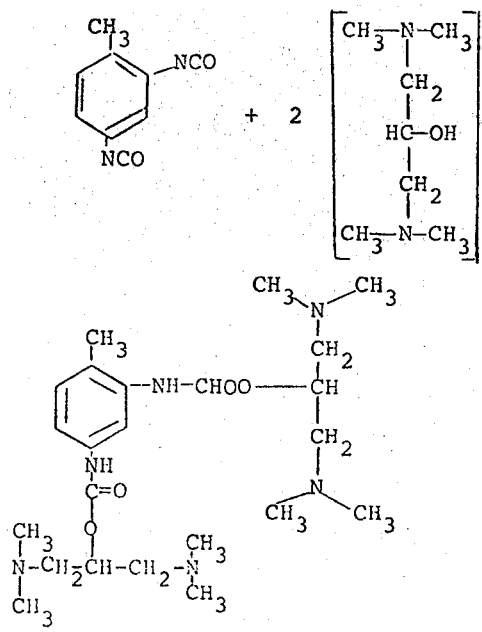

The reaction conditions and amounts to form the tetrafunctional amine were essentially the same as those given in above Example V. The yield of the tetrafunctional amine was 90 percent and the structure was proven by NMR examination. 2.28 g of the formed tetrafunctional amine was mixed with 2.64 g of α,α'-dibromomethyl metaxylene in 50 cc of a 1:1 by volume mixture of DMF and benzene. The formed solution was then heated to 60°C. A practically quantitative yield of the resulting crosslinked resin of this invention was obtained after filtration and drying.

What is claimed is:

1. A cross-linked, water-insoluble, polyquaternary ammonium polymer consisting essentially of the quaternized reaction product of:
   a dihalo substituted organic compound selected from the group consisting of compounds of the formulae:

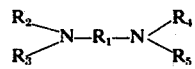

and  $X\text{---}(CH_2)_y X$ where X is chloro, bromo or iodo and $y$ is an integer from 2–20;
   a ditertiary amine of the formula:

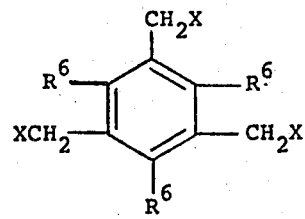

where $R_1$ is alkylene containing from 3–20 carbon atoms; $R_2$–$R_5$ are individually alkyl containing 1–20 carbon atoms; and at least 0.1 and no more than 31 weight percent of a cross-linking agent of the formula:

where X is chloro, bromo or iodo and $R^6$ is hydrogen, methyl or —$CH_2X$, said reactants being present in an essentially stoichiometric ratio of nitrogen to halogen.

2. The polymer of claim 1 wherein the halomethyl substituted aromatic is 2,4,6-trichloromethylmesitylene.

3. The polymer of claim 2 wherein:
   the tertiary amine is tetramethyl-1,6-diaminohexane.

4. The polymer of claim 3 in which the dihalomethylated compound is 1,10-dibromodecane.

5. The polymer of claim 1 further comprising:
   halogens from a halogen source added to the polymer at the nitrogen sites.

6. The polymer of claim 5 wherein the halogens are selected from the group consisting of $I_2$ and $Br_2$.

* * * * *

UNITED STATES PATENT OFFICE
CERTIFICATE OF CORRECTION

Patent No. 3,899,534              Dated August 12, 1975

Inventor(s) Alan Rembaum; Shiao-Ping S. Yen

It is certified that error appears in the above-identified patent and that said Letters Patent are hereby corrected as shown below:

Column 6, line 66, change "application", second occurrence to --is--.

Signed and Sealed this twenty-third Day of December 1975

[SEAL]

Attest:

RUTH C. MASON
*Attesting Officer*

C. MARSHALL DANN
*Commissioner of Patents and Trademarks*